No. 719,687. PATENTED FEB. 3, 1903.
G. W. NICKERSON.
HOOF BOOT OR PAD.
APPLICATION FILED JUNE 2, 1902.
NO MODEL.

Witnesses:
H. B. Davis.
J. L. Hutchinson.

Inventor:
Geo. W. Nickerson
by Noyes & Harriman
Atty's

UNITED STATES PATENT OFFICE.

GEORGE W. NICKERSON, OF WELLFLEET, MASSACHUSETTS.

HOOF BOOT OR PAD.

SPECIFICATION forming part of Letters Patent No. 719,687, dated February 3, 1903.

Application filed June 2, 1902. Serial No. 109,838. (No model.)

*To all whom it may concern:*

Be it known that I, GEORGE W. NICKERSON, of Wellfleet, county of Barnstable, and State of Massachusetts, have invented an Improvement in Hoof Boots or Pads, of which the following description, in connection with the accompanying drawings, is a specification, like characters on the drawings representing like parts.

This invention relates to a form of boot or pad for the hoofs of horses which are especially intended for use to soften and otherwise treat the frog and hoof of a horse when they become dry or diseased.

My invention has for its special object the production of a device of the above-named character to which the packing for the frog may be readily and conveniently applied and which provides an even surface for the horse to stand on while the device is in place.

For an understanding of my invention reference is made to the accompanying drawings, in which—

Figure 1:
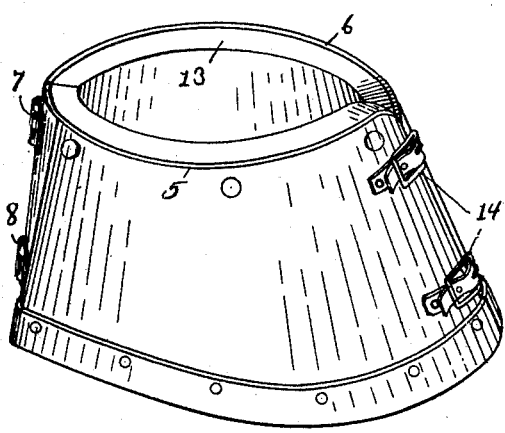
Figure 2:
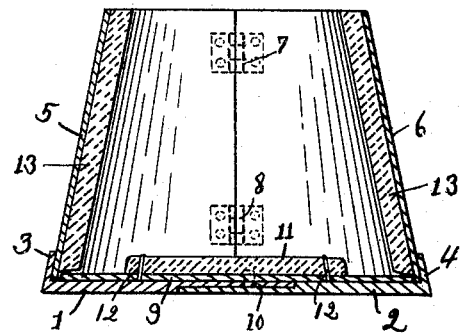
Figure 3:
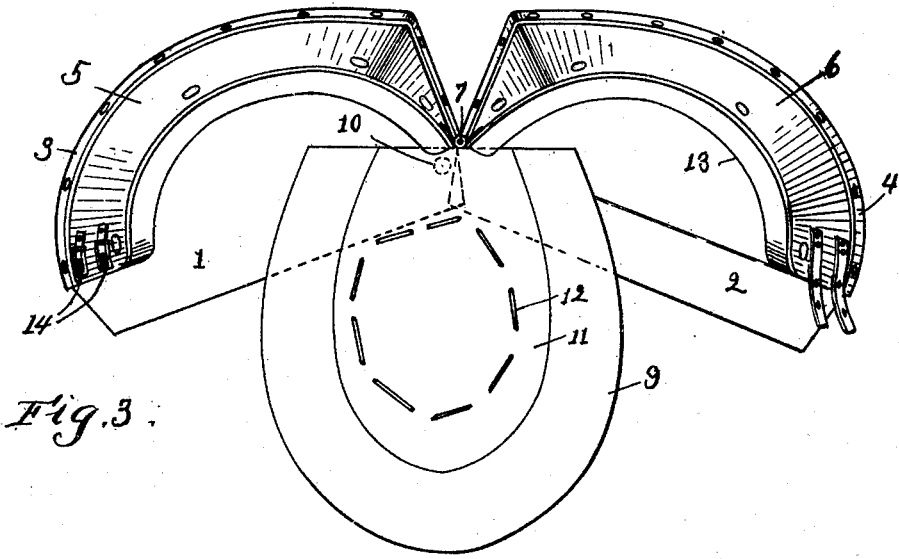

Figure 1 is a perspective view of a device made according to my invention. Fig. 2 is a cross-section thereof, and Fig. 3 is a plan view showing the device in open position ready to be applied.

As shown in the drawings, the device comprises two bottom sections 1 and 2, which are preferably made of cast metal and are provided with recesses in their opposite sides which extend to their edges, so that said edges may overlap and give a perfectly even bottom when the device is closed, as shown in Fig. 2. Each section is also provided with upwardly-extending flanges 3 and 4 about their opposite edges, said flanges being inclined inwardly to a slight extent and having sheet-metal walls 5 and 6, securely riveted to the inner side thereof, said walls being connected at their rear edges by two hinges 7 and 8. These walls 5 and 6 also incline inwardly to correspond with the ordinary inclination of the horse's hoof and are so formed that when the two sections formed by said bottom and sides are swung to their closed position on the hinges 7 and 8, as shown in Fig. 1, they will fit closely about the hoof of the animal.

An independent section or bottom 9, of sheet metal, is pivoted, as indicated at 10, to the bottom section 1, it being shaped to completely cover bottom sections 1 and 2 when they are closed, so that its edges engage walls 5 and 6, and a frog-pad 11 is secured to the middle portion of the upper surface of the independent section 9 by means of a linen or wire thread 12, which is passed through apertures in said section. This pad 11 is made to fit snugly into and fill the space within the shoe, so that it presses gently against the frog and is of felt, moss, or any other suitable substance.

The inner surfaces of the side pieces 5 and 6 are preferably lined with a packing 13, of felt, the packing being secured in any suitable manner.

The front edges of the sides 5 and 6 are provided with buckles and straps 14 for securing the sections together, although any other suitable securing means may be employed.

When it is desired to secure the packing 11 to the independent bottom 9, the two sections are swung apart, so that the bottom 9 is midway between them, as shown in Fig. 3, thus permitting a needle to be readily passed through the pad and bottom 9. When the device is to be applied to the hoof, the packings are first thoroughly saturated with water or other suitable liquid, then the packing 11 is fitted within the shoe, and the bottom 9 is pressed against the bottom of the shoe. The two sections are then closed about the hoof and secured in place by the buckles and straps.

From the foregoing description it will be seen that when the device is in place a perfectly level surface is provided for the bottom of the horse's shoe, and that by having the frog-packing secured to an independent bottom above the bottom sections there is nothing to interfere with the ready closing of the two sections about the hoof, and the holes through said bottom section are closed, so that the moisture in the frog-pad cannot escape through the holes in the bottom thereof.

Having thus described my invention, what I claim as new, and desire to secure by Letters Patent, is—

1. A device for the purpose described, comprising a pair of overlapping bottom sections having upwardly-extending sides secured thereto, said sides and bottoms being suitably shaped and hinged at their rear ends, an independent bottom piece which is pivoted to one of said sections, and a suitable packing on the upper side of said bottom piece, substantially as described.

2. A device for the purpose described, comprising a pair of overlapping bottom sections having upwardly-extending sides secured thereto, said sides and bottoms being suitably shaped and hinged at their rear ends, an independent bottom piece which covers said bottom sections when in their closed position, and a packing which is arranged on said bottom piece, substantially as described.

3. A device for the purpose described comprising a pair of overlapping bottom sections having upwardly-extending sides secured thereto, said sides and bottoms being suitably shaped and hinged at their rear ends, an independent bottom piece which is pivoted to one of said sections at its rear end, and a suitable packing on the upper side of said bottom piece, substantially as described.

In testimony whereof I have signed my name to this specification in the presence of two subscribing witnesses.

GEO. W. NICKERSON.

Witnesses:
LOUIS H. HARRIMAN,
E. C. McRITCHIE.